(12) United States Patent
Takeda

(10) Patent No.: US 11,575,803 B1
(45) Date of Patent: Feb. 7, 2023

(54) IMAGE FORMING APPARATUS AND METHOD CORRECTING DENSITY UNEVENNESS FOR EACH DIVIDED REGION IN A MAIN SCANNING DIRECTION

(71) Applicant: TOSHIBA TEC KABUSHIKI KAISHA, Tokyo (JP)

(72) Inventor: Kazuhisa Takeda, Tagata Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/668,423

(22) Filed: Feb. 10, 2022

(51) Int. Cl.
H04N 1/407 (2006.01)
H04N 1/00 (2006.01)
H04N 1/23 (2006.01)
H04N 1/60 (2006.01)

(52) U.S. Cl.
CPC ......... *H04N 1/407* (2013.01); *H04N 1/00005* (2013.01); *H04N 1/00015* (2013.01); *H04N 1/00031* (2013.01); *H04N 1/00045* (2013.01); *H04N 1/00082* (2013.01); *H04N 1/2338* (2013.01); *H04N 1/6027* (2013.01); *H04N 2201/0094* (2013.01)

(58) Field of Classification Search
None
See application file for complete search history.

(56) References Cited

U.S. PATENT DOCUMENTS

| 11,175,617 B2 * | 11/2021 | Motegi | G03G 15/043 |
|---|---|---|---|
| 2018/0205853 A1 | 7/2018 | Terada | |
| 2018/0234592 A1 * | 8/2018 | Honda | H04N 1/6019 |
| 2019/0064694 A1 * | 2/2019 | Nagai | G03G 15/04072 |

FOREIGN PATENT DOCUMENTS

| JP | 2007-129448 | 5/2007 |
| JP | 2011-112988 | 6/2011 |
| JP | 2014-232149 | 12/2014 |
| JP | 2015-090475 | 5/2015 |

* cited by examiner

*Primary Examiner* — Scott A Rogers
(74) *Attorney, Agent, or Firm* — Amin, Turocy & Watson, LLP

(57) ABSTRACT

An image forming apparatus includes a forming unit, a generation unit, a storage unit, a correction unit, and a changing unit. The forming unit forms an image. The generation unit generates correction data for correcting density unevenness for each of a plurality of regions divided in a main scanning direction of an image formed by the forming unit. The storage unit stores the correction data generated by the generation unit. The correction unit corrects a density of an image to be formed by the forming unit for each of the plurality of regions based on the correction data stored by the storage unit. The changing unit changes an image formation density by the forming unit with a uniform amount of change for the plurality of regions after the correction data is generated by the generation unit.

20 Claims, 7 Drawing Sheets

IMAGE FORMING APPARATUS AND METHOD CORRECTING DENSITY UNEVENNESS FOR EACH DIVIDED REGION IN A MAIN SCANNING DIRECTION

FIELD

Embodiments described herein relate generally to an image forming apparatus.

BACKGROUND

In the image forming apparatus, even if an attempt is made to form pixels having the same density value, the density of actually formed pixels may be uneven at each position along a main scanning direction. Such density unevenness is also called in-plane unevenness and contributes to deterioration of image quality.

Various techniques for correcting such density unevenness are devised. However, further improvement in image quality is required more than that obtained by the techniques devised so far.

DETAILED DESCRIPTION

In general, according to one embodiment, there is provided an image forming apparatus including a forming unit, a generation unit, a storage unit, a correction unit, and a changing unit. The forming unit is configured to form an image. The generation unit is configured to generate correction data for correcting density unevenness for each of a plurality of regions divided in a main scanning direction of an image formed by the forming unit. The storage unit is configured to store the correction data generated by the generation unit. The correction unit is configured to correct a density of an image to be formed by the forming unit for each of the plurality of regions based on the correction data stored by the storage unit. The changing unit is configured to change an image formation density by the forming unit with a uniform amount of change for the plurality of regions after the correction data is generated by the generation unit.

Certain aspects of an image forming apparatus are described in U.S. patent application Ser. No. 15/641,954, filed Jul. 5, 2017 and titled "IMAGE FORMING APPARATUS THAT APPLIES CORRECTION SELECTIVELY TO A SUBSET OF PIXELS", the contents of which are all hereby incorporated by reference.

Hereinafter, an embodiment will be described with reference to the accompanying drawings. In the following embodiment, a multi-function peripheral (MFP) provided with an image forming apparatus as a printer will be described as an example.

First, a configuration of the MFP according to the embodiment will be described.

Figure 1:
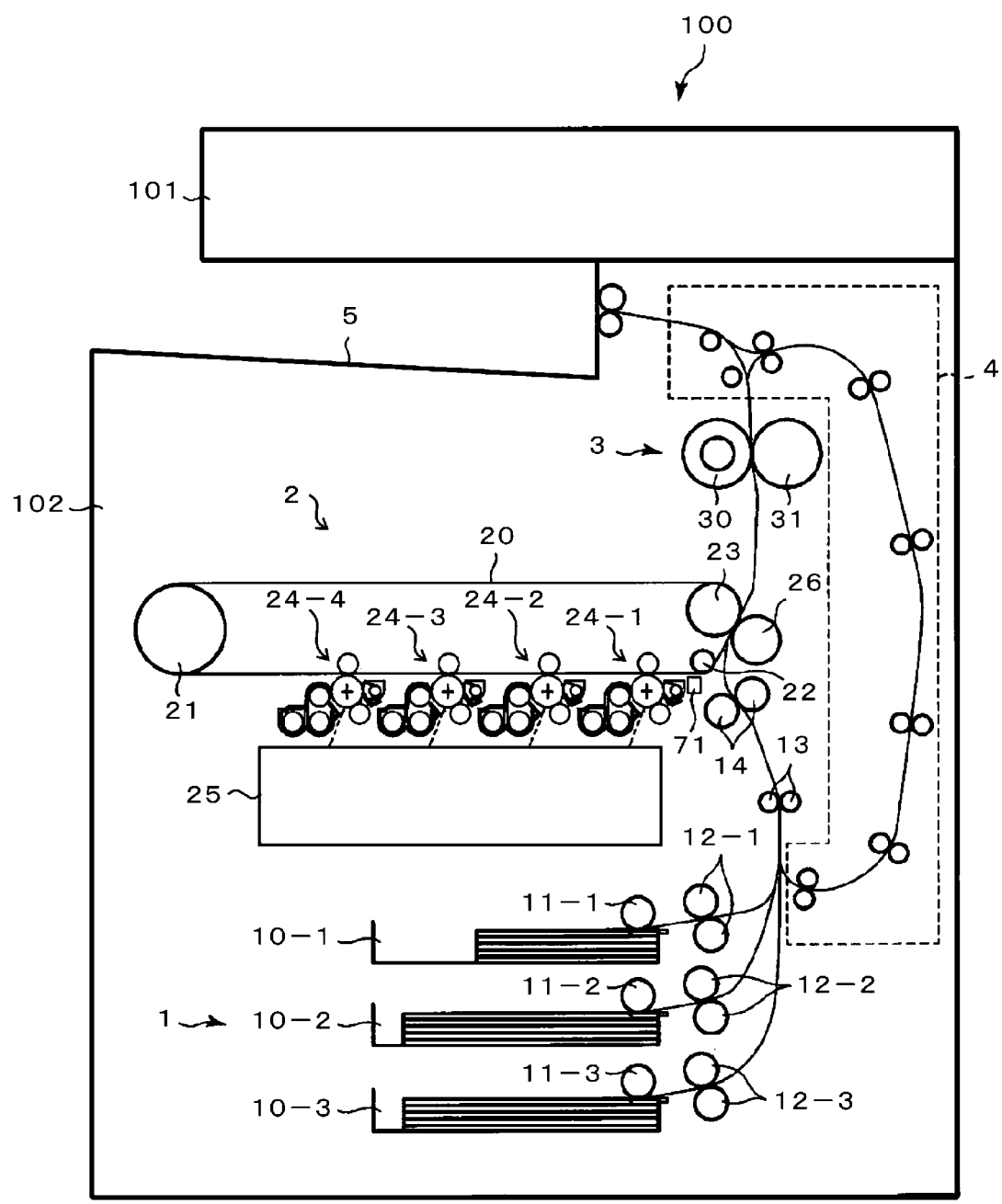
FIG. 1 is a diagram schematically illustrating a mechanical configuration of an MFP according to an embodiment.

FIG. 1 is a diagram schematically illustrating a mechanical configuration of an MFP 100 according to the embodiment.

As illustrated in FIG. 1, the MFP 100 includes a scanner 101 and a printer 102.

The scanner 101 reads an image of an original document and generates image data corresponding to the image. The scanner 101 uses an image sensor such as a charge-coupled device (CCD) line sensor to generate image data according to a reflected light image from a reading surface of the original document. The scanner 101 scans the original document placed on an original document placing stand by an image sensor that moves along the original document. The scanner 101 also scans the original document conveyed by an auto document feeder (ADF) with a fixed image sensor. The scanner 101 is an example of a reading unit.

The printer 102 forms an image on a medium, on which an image is to be formed, by an electrophotographic method. The medium is typically a print paper sheet such as cut paper. Therefore, in the following, description will be made on the assumption that the print paper sheet is used as the medium. However, as the medium, a sheet material made of paper different from the cut paper may be used, or a sheet material made of a material such as a resin other than paper may be used. The printer 102 has a color printing function for printing a color image on the print paper sheet and a monochrome printing function for printing a monochrome image on the print paper sheet. The printer 102 forms a color image by superposing element images, which are obtained by using, for example, toner having three colors of yellow, magenta, and cyan, or four colors obtained by adding black to the three colors, on each other. The printer 102 also forms a monochrome image using, for example, black toner. However, the printer 102 may have only one of the color printing function and the monochrome printing function.

In the configuration example illustrated in FIG. 1, the printer 102 includes a paper feed unit 1, a print engine 2, a fixing unit 3, an automatic double-sided unit (ADU) 4, and a paper discharge tray 5.

The paper feed unit 1 includes paper feed cassettes 10-1, 10-2, and 10-3, pickup rollers 11-1, 11-2, and 11-3, conveyance rollers 12-1, 12-2, and 12-3, a conveyance roller 13, and a registration roller 14.

The paper feed cassettes 10-1, 10-2, and 10-3 store the print paper sheets in a stacked state. The print paper sheets stored in the paper feed cassettes 10-1, 10-2, and 10-3 may be different types of print paper sheets having different sizes and materials, or may be the same type of print paper sheets. The paper feed unit 1 may also include a manual feed tray.

The pickup rollers 11-1, 11-2, and 11-3 take out the print paper sheets one by one from the paper feed cassettes 10-1, 10-2, and 10-3, respectively. The pickup rollers 11-1, 11-2, and 11-3 feed the taken out print paper sheets to the conveyance rollers 12-1, 12-2, and 12-3, respectively.

The conveyance rollers 12-1, 12-2, and 12-3 feed the print paper sheet fed from the pickup rollers 11-1, 11-2, and 11-3 respectively to the conveyance roller 13 via a conveyance path formed by a guide member (not illustrated).

The conveyance roller 13 further conveys the print paper sheet fed from any one of the conveyance rollers 12-1, 12-2, and 12-3, and feeds the print paper sheet to the registration roller 14.

The registration roller 14 corrects an inclination of the print paper sheet. The registration roller 14 adjusts the timing of feeding the print paper sheet to the print engine 2.

The paper feed cassettes, the pickup rollers, and the conveyance rollers are not limited to three sets, and any number of sets may be provided. If the manual feed tray is provided, a set of a paper feed cassette and a pickup roller and a conveyance roller paired with the paper feed cassette may not be provided.

The print engine 2 includes a belt 20, support rollers 21, 22, and 23, image forming units 24-1, 24-2, 24-3, and 24-4, an exposure unit 25, and a transfer roller 26.

The belt 20 has an endless shape and is supported by the support rollers 21, 22, and 23 so as to maintain the state illustrated in FIG. 1. The belt 20 rotates counterclockwise in FIG. 1 as the support roller 21 rotates. The belt 20 temporarily carries an image of toner to be formed on the print paper sheet on an outer surface (hereinafter referred to as an image-carrying surface). That is, the belt 20 is an example of an image carrier. For the belt 20, for example, a semiconductive polyimide is used from the viewpoint of heat resistance and abrasion resistance. The so-called sub-scanning is realized by the movement of the image-carrying surface accompanying the rotation of the belt 20, and the movement direction of the image-carrying surface is also called a sub-scanning direction.

Each of the image forming units 24-1 to 24-4 includes a photoreceptor, a charging roller, a developing device, a transfer roller, and a cleaner, and performs image forming by an electrophotographic method in cooperation with the exposure unit 25. The image forming units 24-1 to 24-4 are arranged along the belt 20 in a state where axial directions of the respective photoreceptors are parallel to each other. The image forming units 24-1 to 24-4 differ only in the color of toner used, and have the same structure and action. The image forming unit 24-1 forms an element image using, for example, black toner. The image forming unit 24-2 forms an element image using, for example, cyan toner. The image forming unit 24-3 forms an element image using, for example, magenta toner. The image forming unit 24-4 forms an element image using, for example, yellow toner. Thus, the image forming units 24-1 to 24-4 are examples of element image forming units, respectively. The image forming units 24-1 to 24-4 allow the element images of respective colors to superpose on each other on the image-carrying surface of the belt 20. With this configuration, the image forming units 24-1 to 24-4 form a color image in which each element image of each color is superposed on the image-carrying surface of the belt 20 at the time point when the belt 20 passes through the image forming unit 24-1. Although not illustrated, a developer container containing a developer containing toner of each color is disposed, for example, in information space of the belt 20. The developer may be a one-component developer consisting only of toner or a multi-component developer containing other substances such as carriers in addition to the toner.

The exposure unit 25 exposes each of the photoreceptors of the image forming units 24-1 to 24-4 according to image data representing the element images of respective colors. As the exposure unit 25, a laser scanner, a light emitting diode (LED) head, or the like is used. The exposure unit 25 includes, for example, a semiconductor laser device, a polygon mirror, an imaging lens system, and a mirror if the laser scanner is used. Then, the exposure unit 25 in this case selectively causes a laser beam emitted from a semiconductor laser element according to image data to be incident on each of the photoreceptors of the image forming units 24-1 to 24-4 by switching an emission direction by the mirror. The exposure unit 25 deflects the laser beam for scanning in an axial direction of the photoreceptor (in the depth direction in FIG. 1) by the polygon mirror. The scanning of the laser beam is so-called main scanning, and the direction thereof is called a main scanning direction.

The transfer roller 26 is disposed in parallel with the support roller 23, and sandwiches the belt 20 between the transfer roller 26 and the support roller 23. The transfer roller 26 pinches the print paper sheet fed from the registration roller 14 between the transfer roller 26 and the image-carrying surface of the belt 20. Then, the transfer roller 26 transfers the image of toner formed on the image-carrying surface of the belt 20 to the print paper sheet by utilizing electrostatic force. That is, a transfer unit is configured with the support roller 23 and the transfer roller 26. Toner may remain on the image-carrying surface of the belt 20 without being completely transferred to the print paper sheet. For that reason, toner adhering to the image-carrying surface of the belt 20 after passing through between the support roller 23 and the transfer roller 26 is removed by a cleaner (not illustrated) before the belt 20 reaches the image forming unit 24-4.

Thus, the print engine 2 forms an image on the print paper sheet fed by the registration roller 14 by the electrophotographic method. That is, the print engine 2 is an example of a forming unit.

The fixing unit 3 includes a fixing roller 30 and a pressure roller 31.

The fixing roller 30 stores a heater inside a hollow roller made of, for example, a heat-resistant resin. The heater is, for example, an induction heating (IH) heater, but any other type of heater may be used as appropriate. The fixing roller 30 fixes toner adhering to the print paper sheet sent out from the print engine 2 on the print paper sheet by melting the toner.

The pressure roller 31 is provided in parallel with the fixing roller 30 and in a state of being pressed against the fixing roller 30. The pressure roller 31 pinches the print paper sheet sent out from the print engine 2 between the pressure roller 31 and the fixing roller 30 and presses the print paper sheet against the fixing roller 30.

The ADU 4 includes a plurality of rollers and selectively performs the following two actions. The first action is to feed the print paper sheet that passes through the fixing unit 3 toward the paper discharge tray 5 as it is. This first action is performed if single-sided printing or double-sided printing is completed. In the second action, the print paper sheet that passes through the fixing unit 3 is once conveyed to the side of the paper discharge tray 5, then switched back and sent to the print engine 2. This second action is performed if image formation on only one side in double-sided printing is completed.

The paper discharge tray 5 receives the print paper sheet on which an image is formed and ejected.

Figure 2:
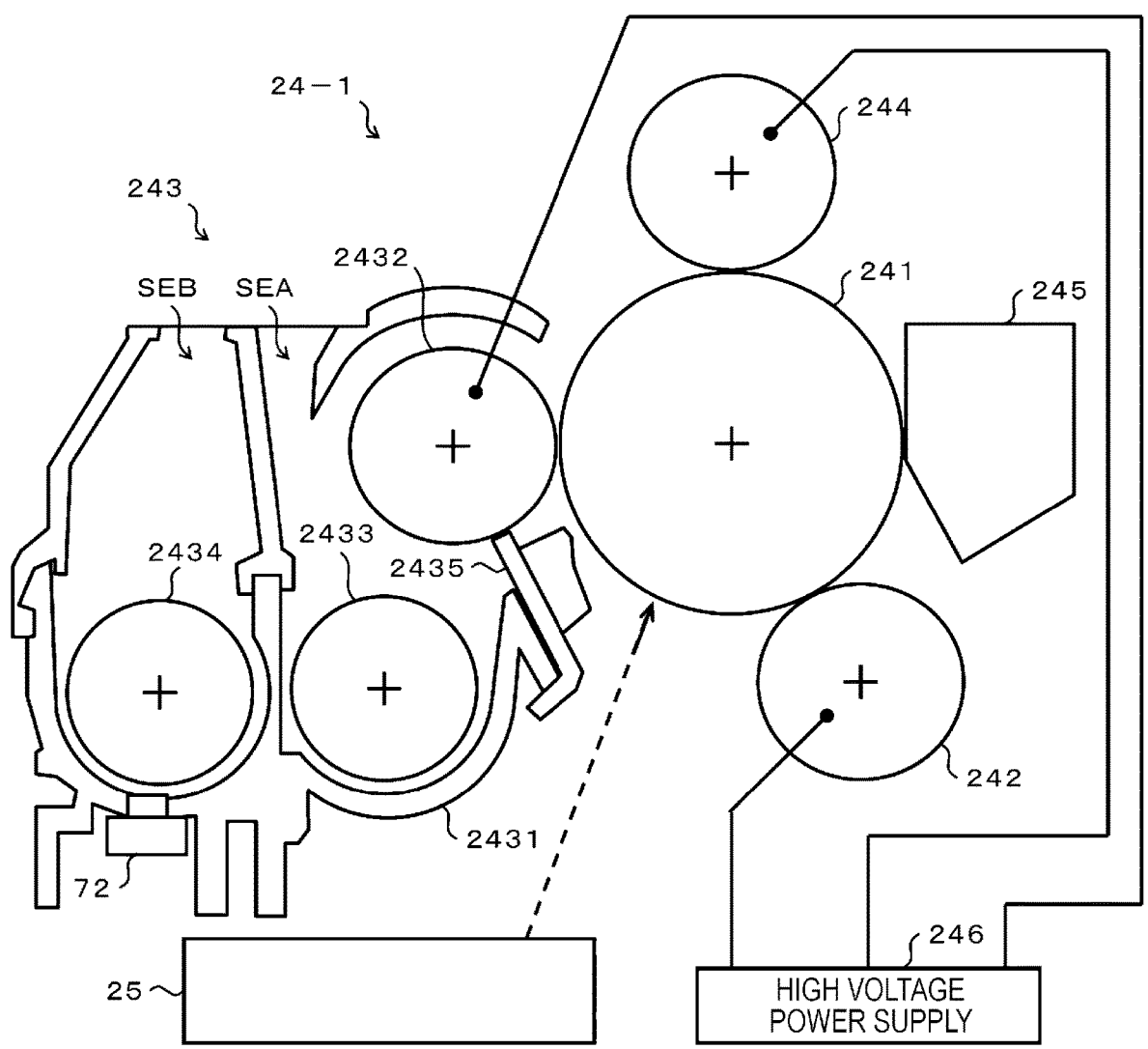
FIG. 2 is a diagram illustrating a configuration of a main part of an image forming unit in FIG. 1 by partially breaking the main part configuration.

FIG. 2 is a diagram illustrating a configuration of a main part of image forming units 24-1 to 24-4 by partially breaking the main part configuration.

Since the image forming units 24-1 to 24-4 have the same configuration, FIG. 2 illustrates only the configuration of the image forming unit 24-1, and the illustration and description of the configuration of the image forming units 24-2 to 24-4 are omitted.

The image forming unit 24-1 is configured by disposing a charging roller 242, a developing device 243, a transfer roller 244, and a cleaner 245 around a photoreceptor 241. The image forming unit 24-1 also includes a high voltage power supply 246.

The photoreceptor 241 is configured by applying a photosensitive conductive material to a curved surface of a base material formed by forming a conductor such as aluminum in a cylindrical shape to form a photosensitive layer. A surface on which the photosensitive layer of the photoreceptor 241 is formed is referred to as a photosensitive surface. The photoreceptor 241 is rotatably supported by a housing or the like of the image forming unit 24-1 in a posture in which an axial center direction thereof is directed in the depth direction in FIG. 2.

The charging roller 242 is formed by forming a conductor such as conductive rubber in a columnar shape. The charging roller 242 is rotatably supported by the housing or the like of the image forming unit 24-1 in a posture in which an axial center direction thereof is directed in the depth direction in FIG. 2. The curved surface of the charging roller 242 is in contact with or close to the photosensitive surface of the photoreceptor 241. The charging roller 242 receives a charging voltage supplied from the high voltage power supply 246 to uniformly charge the photosensitive surface of the photoreceptor 241.

The developing device 243 includes a housing 2431, a developing sleeve 2432, mixers 2433 and 2434, and a doctor blade 2435.

The housing 2431 forms a space for containing a developer inside thereof. That is, the housing 2431 functions as a container for containing the developer. The space inside the housing 2431 is divided into a compartment SEA and a compartment SEB. The compartment SEA and the compartment SEB are connected via an opening (not illustrated in FIG. 3). The developer is, for example, a two-component developer obtained by mixing toner and a carrier.

Figure 3:
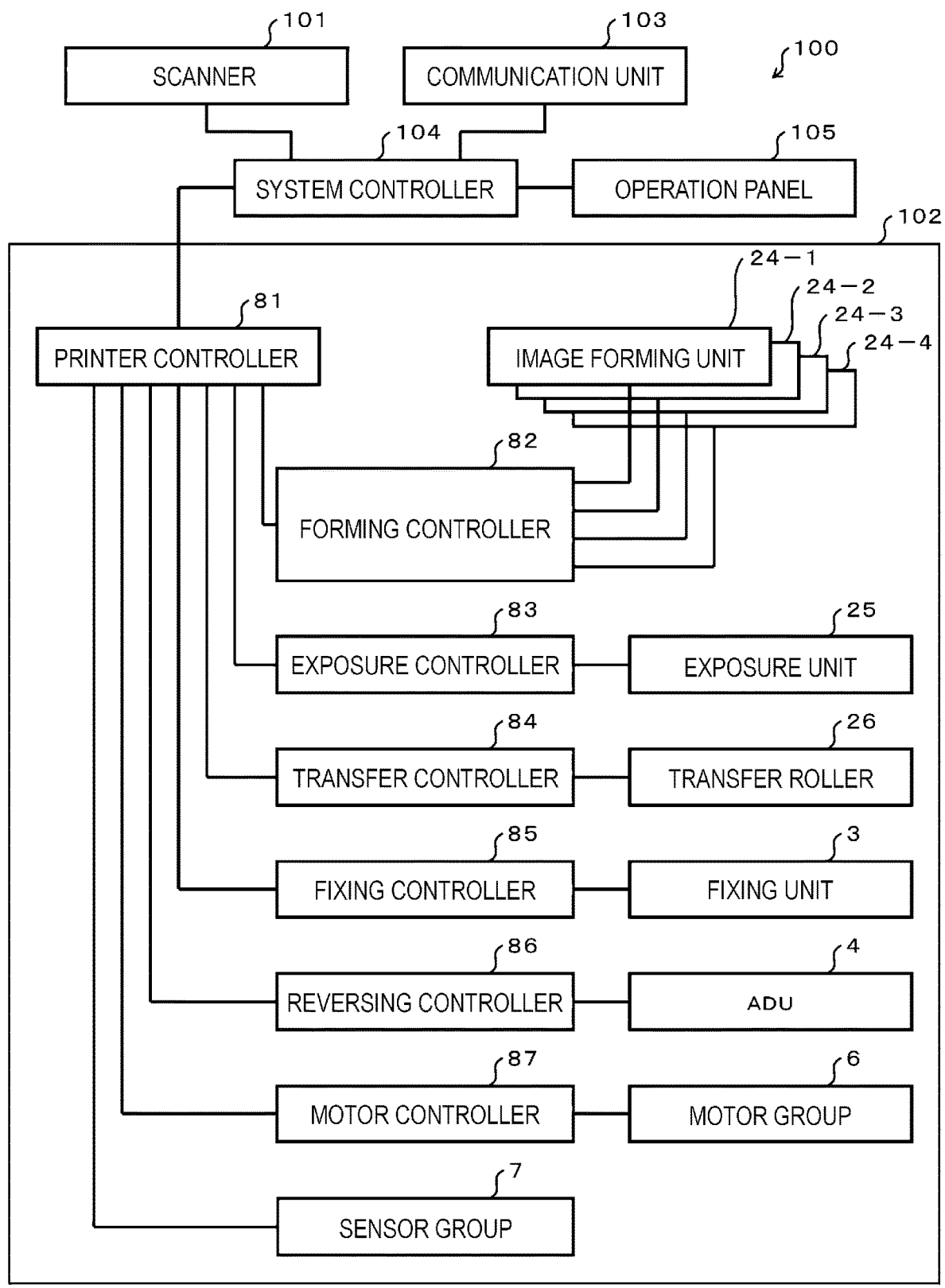
FIG. 3 is a block diagram schematically illustrating a configuration related to the control of the MFP of FIG. 1.

The developing sleeve 2432 has a columnar shape, and is rotatably supported by the housing 2431 in a posture in which the axial center direction is directed in the depth direction in FIG. 3 and in a state where a part thereof is located in the compartment SEA. The developing sleeve 2432 incorporates magnets disposed so that magnetic poles are alternately formed along a peripheral surface in a circumferential direction. The developing sleeve 2432 receives a developing bias supplied from the high voltage power supply 246, and electrostatically adheres the developer to the photosensitive surface of the photoreceptor 241 according to an electrostatic latent image formed on the photoreceptor 241.

The mixers 2433 and 2434 are each configured by attaching a stirrer to a rotating shaft. The mixer 2433 is rotatably supported by the housing 2431 in a posture in which the axial center direction of the rotating shaft is directed in the depth direction in FIG. 2 and in a state of being located near the bottom of the compartment SEA. The mixer 2434 is rotatably supported by the housing 2431 in a posture in which the axial center direction of the rotating shaft is directed in the depth direction in FIG. 2 and in a state of being located near the bottom of the compartment SEB. In the mixers 2433 and 2434, the stirrer rotates in a region represented by a circle in FIG. 2 due to the rotation of the mixers 2433 and 2434 around a rotation axis.

The doctor blade 2435 has a plate shape and is attached to the housing 2431 in a state where a tip thereof is close to the curved surface of the developing sleeve 2432. The doctor blade 2435 limits an amount of the developer that moves from the compartment SEA to the outside of the housing 2431 as the developing sleeve 2432 rotates.

The transfer roller 244 has a columnar shape and is rotatably supported by the housing or the like of the image forming unit 24-1 in a posture in which the axial center direction thereof is directed in the depth direction in FIG. 2. The transfer roller 244 faces the photoreceptor 241 and sandwiches the belt 20 between the transfer roller 244 and the photosensitive surface of the photoreceptor 241. In FIG. 2, the belt 20 is not represented. The transfer roller 244 receives a transfer bias supplied from the high voltage power supply 246 and electrostatically transfers the developer adhering to the photosensitive surface of the photoreceptor 241 to the belt 20.

The cleaner 245 incorporates a cleaning blade in a state where the tip thereof is in contact with or close to the photosensitive surface of the photoreceptor 241. The cleaner 245 scrapes off the developer remaining on the photosensitive surface with a cleaning blade and recovers the developer.

FIG. 3 is a block diagram schematically illustrating a configuration related to the control of the MFP 100. In FIG. 3, the same elements as illustrated in FIG. 1 are denoted by the same reference numerals, and detailed description thereof will be omitted.

The MFP 100 includes a communication unit 103, a system controller 104, and an operation panel 105, in addition to the scanner 101 and the printer 102.

The communication unit 103 performs processing for communicating with an information terminal such as a computer device and an image terminal such as a facsimile device via a communication network such as a local area network (LAN) and a public communication network.

The system controller 104 comprehensively controls each part configuring the MFP 100 in order to realize a desired action as the MFP 100. The desired action of the MFP 100 is, for example, an action for realizing various functions realized by an existing MFP.

The operation panel 105 includes an input device and a display device. The operation panel 105 inputs an instruction by an operator through an input device. The operation panel 105 displays various information to be notified to the operator by the display device. As the operation panel 105, for example, a touch panel, various switches, various lamps, and the like can be used alone or in combination as appropriate.

The fixing unit 3, the ADU 4, the image forming units 24-1 to 24-4, the exposure unit 25, and the transfer roller 26 included in the printer 102 described above are elements to be controlled. In addition to these elements, the printer 102 includes a motor group 6 as an element to be controlled. The motor group 6 includes a plurality of motors for rotating various rotating bodies included in the pickup rollers 11-1, 11-2, and 11-3, the conveyance rollers 12-1, 12-2, and 12-3, the conveyance roller 13, the registration roller 14, the support roller 21, the transfer roller 26, the fixing roller 30, and the image forming unit 24-1 to 24-4, and the roller and the like included in the ADU 4.

The printer 102 further includes a sensor group 7, a printer controller 81, a forming controller 82, an exposure controller 83, a transfer controller 84, a fixing controller 85, a reversing controller 86, and a motor controller 87.

The sensor group 7 includes various sensors for monitoring an action state of the apparatus. As illustrated in FIG. 1, the sensor group 7 includes an adhesion amount sensor 71 disposed so as to face the image-carrying surface of the belt 20 at a position between the image forming unit 24-1 and the transfer roller 26. The adhesion amount sensor 71 measures an amount of the developer adhering to the image-carrying surface of the belt 20. The sensor group 7 includes a density sensor 72 attached to the bottom of the compartment SEB of the housing 2431 as illustrated in FIG. 2. The density sensor 72 measures the concentration of the developer.

The printer controller 81 comprehensively controls each part configuring the printer 102 in order to realize the desired action as the printer 102 under the control of the system controller 104.

The forming controller 82, the exposure controller 83, the transfer controller 84, the fixing controller 85, the reversing controller 86, and the motor controller 87 all act under the control of the printer controller 81 and control actions of the image forming units 24-1 to 24-4, the exposure unit 25, the transfer roller 26, the ADU 4, and the motor group 6, respectively.

Figure 4:
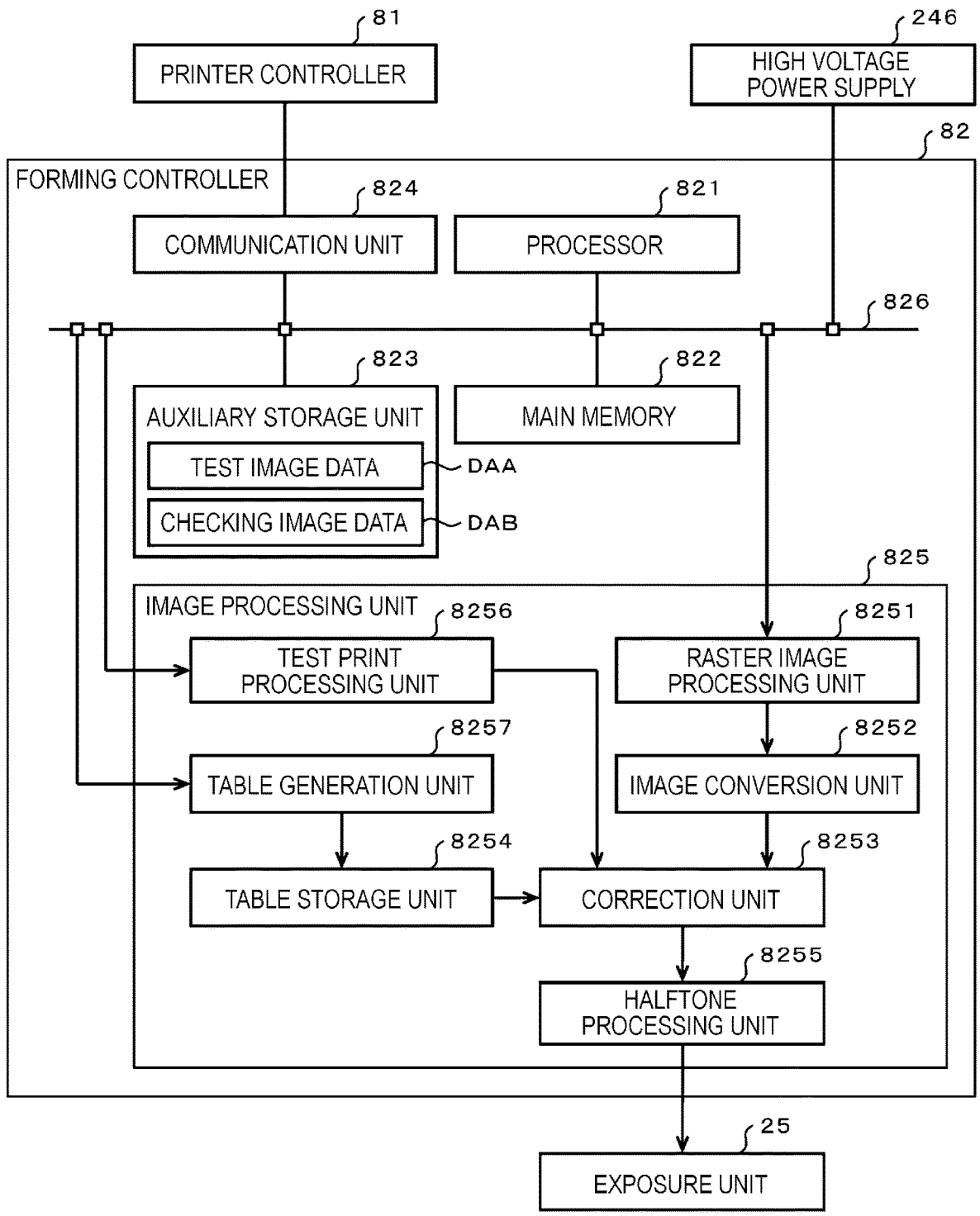
FIG. 4 is a block diagram illustrating a main circuit configuration of a forming controller in FIG. 3.

FIG. 4 is a block diagram illustrating a main circuit configuration of the forming controller 82.

The forming controller 82 includes a processor 821, a main memory 822, an auxiliary storage unit 823, a communication unit 824, an image processing unit 825, and a transmission line 826.

By connecting the processor 821, the main memory 822, and the auxiliary storage unit 823 via the transmission line 826, a computer that performs information processing for controlling the image forming units 24-1 to 24-4 is configured.

The processor 821 corresponds to a central part of the computer. The processor 821 executes information processing described later according to an information processing program such as an operating system, a middleware, and an application program.

The main memory 822 corresponds to a main memory portion of the computer. The main memory 822 includes a non-volatile memory region and a volatile memory region. The main memory 822 stores the information processing program in the non-volatile memory region. The main memory 822 may store data needed for the processor 821 to execute processing for controlling each part in the non-volatile or volatile memory region. The main memory 822 uses the volatile memory region as a work area where data is appropriately rewritten by the processor 821.

The auxiliary storage unit 823 corresponds to an auxiliary storage portion of the computer. As the auxiliary storage unit 823, for example, well-known storage devices such as an electric erasable programmable read-only memory (EE-PROM), a hard disk drive (HDD), and a solid state drive (SSD) can be used alone or by combining these components. The auxiliary storage unit 823 stores data used by the processor 821 for performing various processing and data generated in the processing by the processor 821. The auxiliary storage unit 823 stores the information processing program. The auxiliary storage unit 823 stores test image data DAA and checking image data DAB as data used by the processor 821 for performing various processing. The test image data DAA and the checking image data DAB will be described later.

The communication unit 824 communicates with the printer controller 81.

Four image processing units 825 respectively corresponding to the image forming units 24-1 to 24-4 are included in the forming controller 82. Each of the four image processing units 825 sets the element image formed by the corresponding image forming unit as a processing target. That is, for example, the image processing unit 825 corresponding to the image forming unit 24-1 sets a black element image as a processing target. In the following, a color of an element image targeted for processing is referred to as a target color. Since four image processing units 825 have the same configuration, in FIG. 4, only the configuration of one image processing unit 825 is represented, and the illustration of the other three image processing units 825 is omitted.

The image processing unit 825 includes a raster image processing unit 8251, an image conversion unit 8252, a correction unit 8253, a table storage unit 8254, a halftone processing unit 8255, a test print processing unit 8256, and a table generation unit 8257.

The raster image processing unit 8251 converts image data given as a print target into element image data representing an element image of the target color in raster format. Specific processing executed by the raster image processing unit 8251 may be, for example, the same processing as that performed by an existing apparatus of the same type.

The image conversion unit 8252 performs conversion processing such as color conversion processing and filter processing on the element image data obtained by the raster image processing unit 8251. Specific processing executed by the image conversion unit 8252 may be, for example, the same processing as that performed by an existing apparatus of the same type.

The correction unit 8253 performs correction processing of element image data for compensating for in-plane unevenness with reference to the table storage unit 8254. The correction processing by the correction unit 8253 will be described later.

The table storage unit 8254 stores a correction table for in-plane unevenness correction. The correction table will be described later.

The element image data corrected by the correction unit 8253 is given to the halftone processing unit 8255. This element image data remains in raster format. The halftone processing unit 8255 converts image data output from the correction unit 8253 into element image data in a pseudo halftone format using, for example, an error diffusion method, a dither method, or a density pattern method. Specific processing executed by the halftone processing unit 8255 may be, for example, the same processing as that performed by an existing apparatus of the same type.

The test print processing unit 8256 performs processing for printing a test image under the instruction of the processor 821.

The table generation unit 8257 generates the correction table based on image data obtained by scanning the test image with the scanner 101, and updates the correction table stored in the table storage unit 8254.

The transmission line 826 includes an address bus, a data bus, a control signal line and the like, and transmits data and a control signal transmitted and received between the connected parts.

Next, an action of the MFP 100 configured as described above will be described. The contents of various actions and various processing described below are examples, and changes in the order of some actions and processing, omission of some actions and processing, addition of other actions and processing, and the like can be made appropriately.

In the following, an operation different from that of the existing MFP of the same type will be mainly described, and the description of other actions will be omitted. The characteristic action of the MFP 100 in this embodiment is an action of the forming controller 82.

If an image is to be printed by the printer 102, if image data targeted for printing represents a color image, the processor 821 gives the image data to each of the four image processing units 825. That is, color image data is input to each of the four raster image processing units 8251. Each of the four raster image processing units 8251 generates element image data representing an element image of each of the colors of black, cyan, magenta, and yellow in raster format from the given image data.

The element image data of each color is processed by each of the four image processing units 825, but in the following, processing related to element image data of one color will be described below.

The image conversion unit 8252 performs conversion processing such as color conversion processing and filter processing on the element image data generated by the raster image processing unit 8251. A part of the color conversion processing is processing that takes into consideration a property of the target color.

The correction table stored by the table storage unit 8254 is a data table in which an output value is correlated with each of a plurality of input values. The plurality of input values are gradation values that can be represented by the element image data generated by the raster image processing unit 8251. That is, if gradation values of 0 to 255 are used in the element image data generated by the raster image processing unit 8251, the input values of the correction table are values of 0 to 255, respectively. The output value represents the gradation value after correction from the gradation value represented by the element image data generated by the raster image processing unit 8251. The input value and the output value may be the same. In the correction table, a correlation between the input value and the output value is represented for each of a plurality of regions set by dividing a print width in the main scanning direction in the image forming units 24-1 to 24-4. In this embodiment, the print width in the main scanning direction is divided into four equal parts, and four regions of the region A, the region B, the region C, and the region D are set.

The correction unit 8253 replaces each of the gradation values represented by the element image data output from the raster image processing unit 8251 with an output value correlated with the same input value in the correction table for a region to which a pixel position, to which the gradation value is applied, belongs. With this configuration, the gradation value represented by the element image data is adjusted for each region to correct in-plane unevenness.

The element image data after correction is converted into element image data in a pseudo halftone format by the halftone processing unit 8255, and then supplied to the exposure unit 25 for exposure of the target color.

That is, by adjusting the exposure amount in the exposure unit 25 in each of the region A, the region B, the region C, and the region D, in-plane unevenness of element images formed by image forming units 24-1 to 24-4 is corrected.

However, for example, due to the difference in the degree of partial deterioration of a photosensitive drum and the like, an occurrence state of unevenness during image formation in the image forming units 24-1 to 24-4 gradually changes, and eventually the correction table stored in the table storage unit 8254 may not be appropriate for correcting in-plane unevenness. In this case, in-plane unevenness cannot be sufficiently corrected by correction processing in the correction unit 8253, and in-plane unevenness of a printed image becomes conspicuous.

A maintenance worker such as a user or a serviceman who notices an increase in in-plane unevenness from the printed image instructs adjustment of in-plane unevenness correction through, for example, a predetermined operation on the operation panel 105. In response to this instruction, the printer controller 81 instructs the forming controller 82 to start adjustment. In response to this instruction, the processor 821 in the forming controller 82 starts information processing (hereinafter referred to as an adjustment process) described below according to the information processing program stored in the main memory 822 or the auxiliary storage unit 823.

Figure 5:
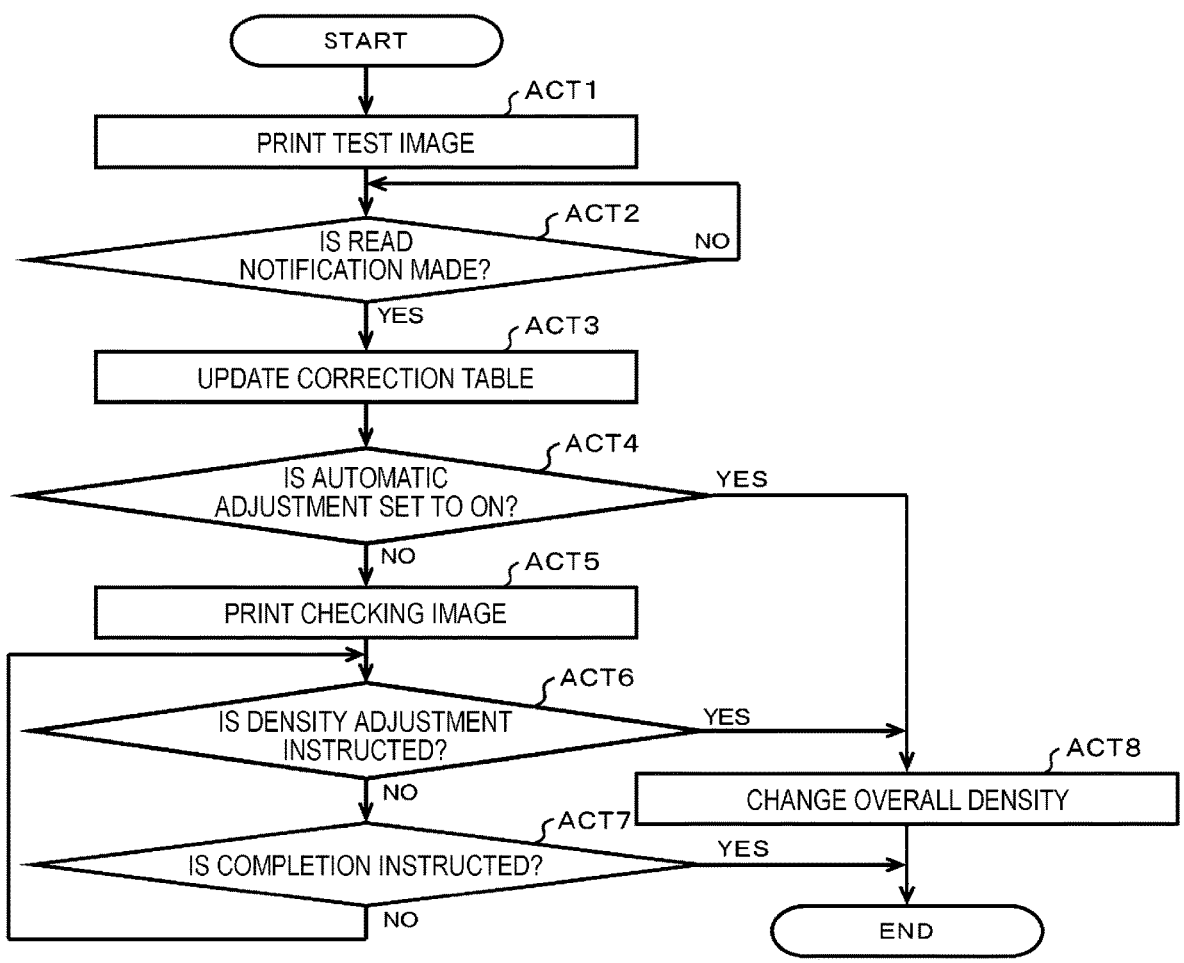
FIG. 5 is a flowchart of an adjustment process.

FIG. 5 is a flowchart of an adjustment process.

As ACT 1, the processor 821 prints a test image. For example, the processor 821 starts the action of the image forming units 24-1 to 24-4, reads out the test image data DAA stored in the auxiliary storage unit 823, and sends the test image data DAA to four test print processing units 8256.

Figure 6:
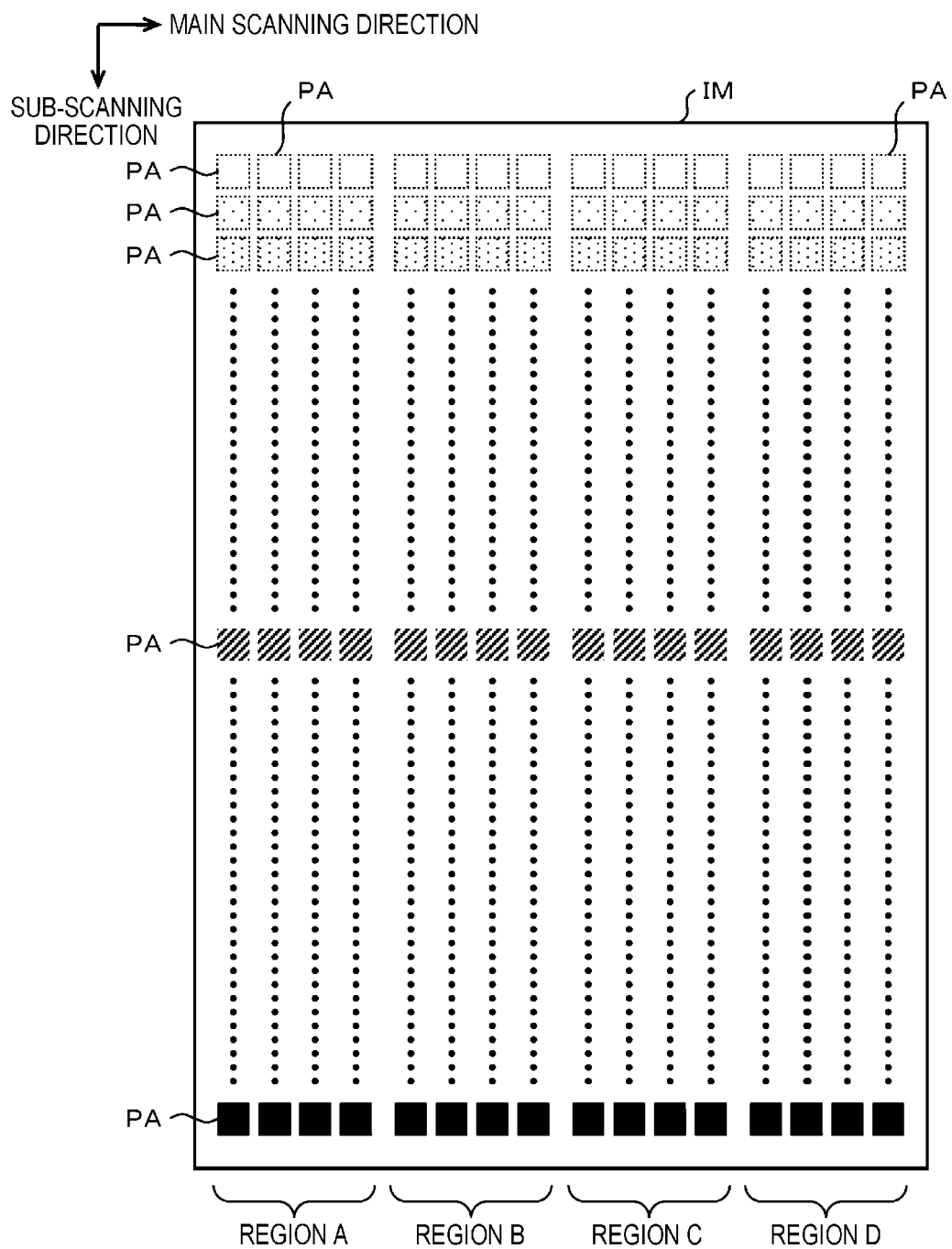
FIG. 6 is a diagram illustrating a test image represented by test image data.

FIG. 6 is a diagram illustrating a test image IM represented by the test image data.

The test image IM is an image illustrating a large number of patches PAs arranged in the main scanning direction and the sub-scanning direction. However, in FIG. 6, only some patches PAs are illustrated, and the illustration of many other patches PAs is omitted. FIG. 6 mainly illustrates the state of an arrangement of respective patches, and the patches do not faithfully represent actual patches.

The test image IM includes four patches PAs aligned in the main scanning direction in each of the region A to the region D. The colors of these four patches PAs are yellow, magenta, cyan and black, respectively. All patches PAs aligned in the main scanning direction have the same gradation value. That is, four of the plurality of patch PAs aligned in the main scanning direction, which are located in different regions, all have the same color and the same gradation value.

The plurality of patches PAs aligned in the sub-scanning direction in the test image IM are all the same color. The plurality of patch PAs aligned in the sub-scanning direction have different gradation values. The gradation value of the patch PA illustrated at the top in FIG. 6 is the minimum, and the gradation value gradually increases toward the bottom in FIG. 6. In the following, a plurality of patches PAs aligned in the sub-scanning direction will be referred to as a patch line. In the test image IM, a plurality of patch lines are aligned side by side along the main scanning direction. The degree of change in the gradation value of each patch PA in one patch line is the same for each patch line.

Thus, each of the region A to the region D includes the patch lines of respective colors, and a formation state of each patch PA is the same.

The test print processing unit 8256 generates element image data related to the element image of the target color in the test image IM from the image data, and gives the element image data to the correction unit 8252. The element image data is supplied to the exposure unit 25 after being subjected to executing process by the correction unit 8253 and the halftone processing unit 8255. Then, by the well-known forming action by the image forming units 24-1 to 24-4 and the exposure unit 25, on the image-carrying surface of the belt 20, a black patch is formed by the image forming unit 24-1, a cyan patch is formed by the image forming unit 24-2, a magenta patch is formed by the image forming unit 24-3, and a yellow patch is formed by the image forming unit 24-4, respectively. The print paper sheet, onto which the test image formed on the image-carrying surface of the belt 20 is transferred and fixed by the transfer roller 26 and the fixing unit 3, is ejected to the paper discharge tray 5.

In the test image printed on the print paper sheet in this way, due to the influence of in-plane unevenness, a difference in density occurs in each of the region A to the region D even between the patch PAs aligned side by side in the main scanning direction. That is, although the disposition of the patches PAs is the same between the image represented by the test image data and the image actually printed, the relationship between densities of the patches PAs is different.

The maintenance worker sets the print paper sheet on which the test image is printed and ejected to the paper discharge tray 5 in the scanner 101, and instructs the scanner to read the printed paper through, for example, a predetermined operation on the operation panel 105. If the scanner 101 reads the test image in response to this instruction, the system controller 104 notifies the forming controller 82 that the test image is read. Subsequently, the system controller 104 sends image data (hereinafter referred to as read data) generated by the scanner 101 to the forming controller 82.

If the processor 821 finishes printing the test image, the processor 821 proceeds to ACT 2 in FIG. 5.

As ACT 2, the processor 821 waits for read notification. Then, if the read is notified from the system controller 104 as described above, the processor 821 determines YES, and proceeds to ACT 3.

As ACT 3, the processor 821 updates the correction table. For example, the processor 821 instructs the table generation unit 8257 to start updating, and then sends the read data sent from the system controller 104 to the table generation unit 8257.

If the update start is instructed and the read data is sent from the processor 821, the table generation unit 8257 analyzes the read data and obtains a relationship between a density value (hereinafter referred to as an original density value) of each patch PA represented by the test image data and a density value (hereinafter referred to as a read value) of each patch PA represented by the read data for each region for the target color.

The table generation unit 8257, for example, obtains a linear approximation formula for scatter data obtained by plotting the density value represented by the read data for each of the plurality of patches PAs included in one patch line in the coordinate system where the position in the test image along the sub-scanning direction is defined as the horizontal axis and the density value represented by the read data is defined as the vertical axis. Then, the table generation unit 8257, for example, obtains such a linear approximation formula for each of the four patch lines of contrast colors.

Figure 7:
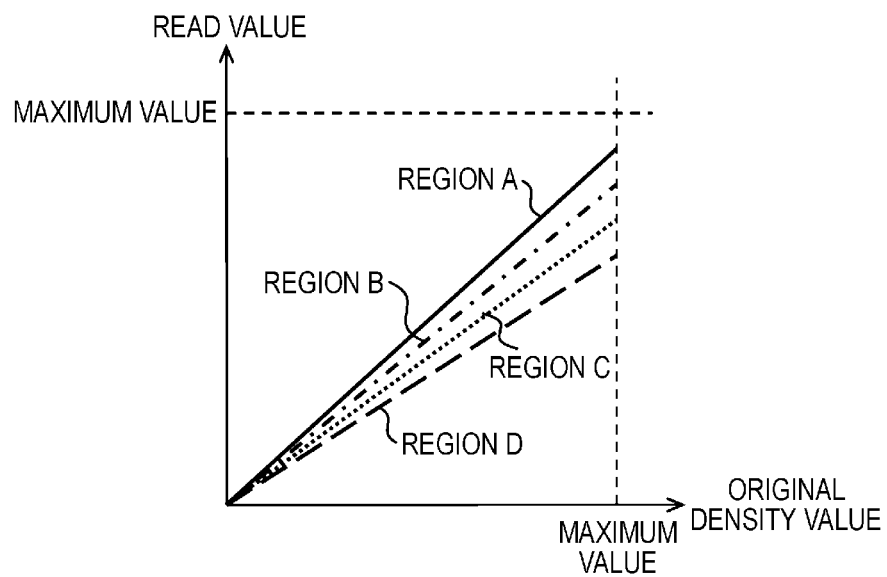
FIG. 7 is a diagram illustrating approximate straight lines represented by linear approximation formulas obtained for a region A to region D for one color.

FIG. 7 is a diagram illustrating approximate straight lines represented by linear approximation formulas obtained for each of the region A to the region D for one color.

Since the gradation value of each patch PA in the patch line in the test image IM gradually changes in the sub-scanning direction, the position in the test image along the sub-scanning direction corresponds to the original density value. Therefore, in FIG. 7, the horizontal axis is the original density value.

FIG. 7 illustrates an example in which the density of the patch in the test image actually printed in each region is lower than the original density value, but a rate of decrease of the density increases toward the region D.

The table generation unit 8257 uses, for example, a region where the rate of decrease of a read density value with respect to the original density value is the largest, that is, a region where the slope of the linear approximation formula is the smallest as a reference region. For example, the table generation unit 8257 generates the correction table so as to represent the input value and the same output value as the input value in correlation with each other for the reference region and represent the input value and the output value smaller than this input value in correlation with each other for the other regions. The table generation unit 8257 determines, for example, the output value for a region other than the reference region to compensate for the difference between a rate of decrease of the density in that region and the rate of decrease of the density in the reference region. The table generation unit 8257 generates, for example, the correction table as a data table in which the output value determined for each region is correlated with the input value. Then, the table generation unit 8257 rewrites the correction table stored in the table storage unit 8254 with the correction table generated in this way. Here, the correction table is an example of correction data. Thus, the table generation unit 8257 corresponds to a generation unit that generates a correction table as correction data. The table storage unit 8254 corresponds to a storage unit that stores the correction table as correction data.

Figure 8:
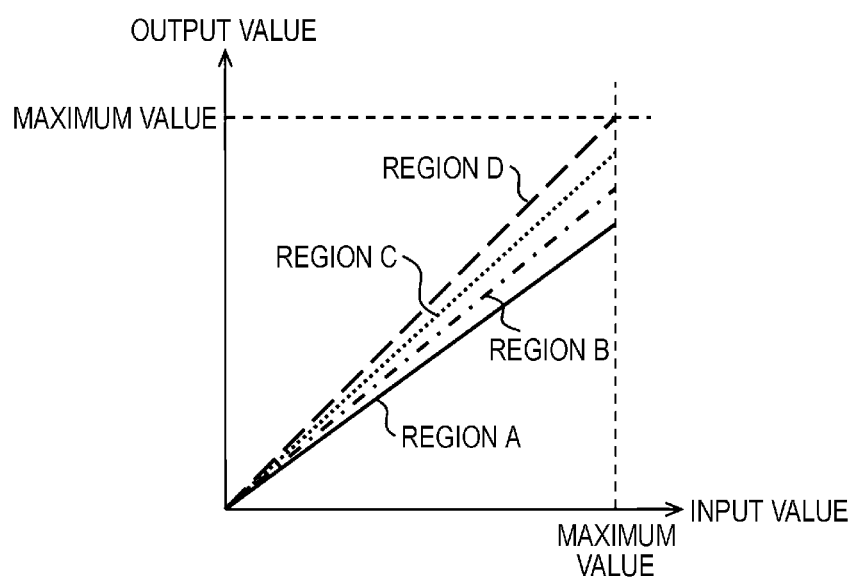
FIG. 8 is a diagram illustrating a relationship between an input value and an output value represented in a correction table for one color.

FIG. 8 is a diagram illustrating the relationship between the input value and the output value represented in the correction table for one color.

FIG. 8 relates to the correction table generated in response to the acquisition of the linear approximation formula representing the approximate straight line of FIG. 7.

If the table generation unit 8257 updates the correction table as described above, the processor 821 proceeds to ACT 4 in FIG. 5.

As ACT 4, the processor 821 checks whether or not an automatic adjustment of the density accompanying the update of the correction table is set to ON. The ON and OFF of this automatic adjustment is appropriately set by the user, for example, through a predetermined operation on the operation panel 105. Then, for example, setting information representing the setting of the automatic adjustment is generated by the processor 821 and stored in the auxiliary storage unit 823. Then, in ACT 4, the processor 821 makes a determination based on the setting information stored in the auxiliary storage unit 823. If the automatic adjustment is set to OFF, the processor 821 determines NO and proceeds to ACT 5.

As ACT 5, the processor 821 prints a checking image. For example, the processor 821 starts the action of the image forming units 24-1 to 24-4, reads out checking image data DAB stored in the auxiliary storage unit 823, and sends the checking image data DAB to the four raster image processing units 8251. The checking image represented by the checking image data DAB is an image so that the maintenance worker can visually check the density during printing. The content of the checking image may be freely determined by, for example, the designer of the MFP 100. Thus, by executing information processing by the processor 821 based on the information processing program, the computer having the processor 821 as the central part functions as a first control unit.

The checking image data is supplied to the exposure unit 25 after being processed by the raster image processing unit 8251, the image conversion unit 8252, the correction unit 8253, and the halftone processing unit 8255. Then, a checking image is formed on the image-carrying surface of the belt 20 by a well-known forming action by the image forming units 24-1 to 24-4 and the exposure unit 25. The print paper sheet on which the checking image formed on the image-carrying surface of the belt 20 is transferred and fixed by the transfer roller 26 and the fixing unit 3 is ejected to the paper discharge tray 5.

With respect to the checking image printed on the print paper sheet in this way, correction is performed by the correction unit 8253 using the correction table updated immediately before as described above, and thus in-plane unevenness is significantly reduced. However, by generating the correction table with the region having the lowest read value as the reference region and reducing the output values for other regions, before and after updating the correction table, the overall density of the printed image is lower after the update.

Therefore, the maintenance worker visually checks the checking image printed on the print paper sheet ejected to the paper discharge tray 5, and determines whether or not the density is too low. If it is determined that the density is too low, the maintenance worker instructs the density adjustment through, for example, a predetermined operation on the operation panel 105. If it is determined that there is no problem with the density, the maintenance worker instructs the completion through, for example, a predetermined operation on the operation panel 105.

If the processor 821 finishes printing the checking image, the processor 821 proceeds to ACT 6 in FIG. 5.

As ACT 6, the processor 821 checks whether or not the concentration adjustment is instructed. Then, if an event corresponding to the concentration adjustment instruction cannot be checked, the processor 821 determines NO and proceeds to ACT 7.

As ACT 7, the processor 821 checks whether or not the completion is instructed. Then, if an event corresponding to the completion instruction cannot be checked, the processor 821 determines NO and returns to ACT 6.

Thus, the processor 821 waits for the adjustment instruction or the completion instruction, as ACT 6 or ACT 7. Then, if the density adjustment is instructed as described above, the processor 821 determines YES in ACT 6 and proceeds to ACT 8. Thus, by executing information processing by the processor 821 based on the information processing program, the computer having the processor 821 as the central part functions as a receiving unit.

If the automatic adjustment is set to ON, the processor 821 determines YES in ACT 4 and proceeds to ACT 8 without performing ACT 5 to ACT 7.

As ACT 8, the processor 821 executes a change in the overall density to compensate for the decrease in concentration described above accompanying the update of the correction table. The processor 821, for example, increases a setting value of the developing bias in the high voltage power supply 246 by a predetermined voltage. If the image forming units 24-1 to 24-4 are in an acting state, the high voltage power supply 246 supplies a developing bias of a voltage value according to the setting value to the developing sleeves 2432 provided in each of the image forming units 24-1 to 24-4. Accordingly, after that, image formation is performed by the image forming units 24-1 to 24-4 in a state where the developing bias of the voltage corresponding to the increased setting value is supplied to the developing sleeve 2432. With this configuration, a developing density in the developing device 243 increases, and the density of the image uniformly formed regardless of the position in the main scanning direction is increased. That is, the overall density of the image is uniformly increased. Thus, by executing information processing by the processor 821 based on the information processing program, the computer having the processor 821 as the central part functions as a changing unit and a second control unit.

An increment of the developing bias if the overall density described above is changed may be appropriately determined by, for example, the designer of the MFP 100. For example, if the amount of decrease in an average density value due to the adjustment of exposure amount accompanying the update of the correction table is N, it is assumed that the increment of the developing bias is set as a voltage required to increase the density value of toner formed by development in the developing device 243 by N.

Then, the processor 821 ends the adjustment process of FIG. 5. If the completion instruction is issued while the processor 821 is in the standby state of ACT 6 and ACT 7, the processor 821 determines YES in the ACT 7 and ends the adjustment process of FIG. 5 without executing the ACT 8.

As described above, if the correction table for in-plane unevenness correction is updated, the MFP 100 increases the developing bias to compensate for the decrease in the density of the image formed due to the change in the exposure amount accompanying the update of the correction table. Therefore, by updating the correction table, an accuracy of in-plane unevenness correction is improved to reduce in-plane unevenness, and then the decrease in the density of the whole image accompanying the update of the correction table can be prevented.

If the correction table for in-plane unevenness correction is updated, the MFP 100 prints the checking image and causes the maintenance worker to check the density, and then executes the change in the overall density according to the instruction from the maintenance worker. Therefore, it is possible not to change the overall density if the density decrease accompanying the update of the correction table is small and the like.

If the automatic adjustment is set to ON, the MFP 100 automatically executes the change in the overall density without receiving the instruction of the maintenance worker. Therefore, by setting the automatic adjustment to ON, the labor of the maintenance worker can be saved.

With the MFP 100, the user or the like can freely set whether or not to automatically change the overall density.

This embodiment can be modified in various ways as follows.

Reading of the test image may be performed by any reading device externally attached to the MFP 100.

The automatic adjustment function may be omitted. That is, the processor 821 may proceed from ACT 3 to ACT 5 in FIG. 5, for example.

The overall density may be changed without fail after the correction table is updated without the check using the checking image. That is, the processor 821 may proceed from ACT 3 to ACT 8 in FIG. 5, for example.

If the overall density is changed according to the density adjustment instruction after the check using the checking image, the check using the checking image may be performed again. That is, for example, if the processor 821 proceeds from ACT 6 to ACT 8 in FIG. 5, the processor 821 may repeat ACT 5 and subsequent actions after ACT 8 ends.

As long as a device that forms an image by an electrophotographic method is used, the same implementation as described above can be performed in various apparatuses other than the MFP such as a copier, a printer, and a facsimile machine.

The change in the overall density may be realized by changing an exposure intensity by the exposure unit 25, changing a charging potential of the photosensitive surface by the charging roller 242, changing the density value in the image data, and the like. Alternatively, a plurality of these developing biases, exposure intensities, charging potentials, density values, and the like may be changed. If the overall density is changed by changing conditions that are not unique to the electrophotographic method, such as changing the density value in image data, even in a printer of a type different from the electrophotographic method, the method of in-plane unevenness correction processing and the method of changing the overall density can be used as it is.

The number of image forming units is not limited to four, and it is sufficient to include at least one image forming unit.

Each function realized by the processor 821 by information processing in the embodiment described above can also be realized partially or entirely by hardware, such as a logic circuit or the like, that executes information processing that is not based on a program. Each of the functions described above can be realized by combining software control with hardware described above such as a logic circuit.

While certain embodiments have been described, these embodiments have been presented by way of example only, and are not intended to limit the scope of the inventions. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming apparatus, comprising:
   a forming component configured to form an image;
   a generation component configured to generate correction data for correcting density unevenness for each of a plurality of regions divided in a main scanning direction of the image formed by the forming component;
   a storage component configured to store the correction data generated by the generation component;
   a correction component configured to correct a density of the image to be formed by the forming component for each of the plurality of regions based on the correction data stored by the storage component; and
   a changing component configured to change an image formation density by the forming component with a uniform amount of change for the plurality of regions after the correction data is generated by the generation component.

2. The image forming apparatus according to claim 1, wherein
   the correction component is configured to update the correction data so as to reduce densities in other regions of the plurality of regions so as to match a minimum density among densities in the plurality of regions, and
   the changing component is configured to increase the image formation density by the forming component so as to compensate for density decrease due to the update of the correction data by the correction component.

3. The image forming apparatus according to claim 1, wherein
   the generation component is configured to cause the forming component to execute image formation, which is based on image data representing a test image in which patches of a same density value are placed in each of the plurality of regions, with the correction in the correction component, and determine a degree of unevenness of a density of each of the patches arranged in each of the plurality of regions based on the image data obtained by reading the test image formed by executing the image formation.

4. The image forming apparatus according to claim 3, wherein
   the generation component is configured to determine the degree of unevenness of the density as a difference between a minimum value of respective densities of the patches arranged in each of the plurality of regions in the formed test image and the density of each of the patches.

5. The image forming apparatus according to claim 3, further comprising:
   a reading component configured to read an image,
   wherein the generation component is configured to determine the degree of unevenness of the density of each of the patches arranged in each of the plurality of regions based on image data obtained by reading the test image formed by the forming component by the reading component.

6. The image forming apparatus according to claim 1, wherein
   the forming component includes a plurality of element image forming components that form element images of different colors,
   the generation component is configured to generate correction data for correcting density unevenness for each of the plurality of regions divided in the main scanning direction of element images respectively formed by the plurality of element image forming components for each of the plurality of element image forming components,
   the storage component is configured to store a plurality of correction data generated by the generation component, respectively,
   the correction component is configured to correct a density of each of the element images formed by the element image forming component for each of the plurality of regions based on a plurality of correction data stored by the storage component, and
   the changing component is configured to change image formation density by the element image forming component with the uniform amount of change for each of the plurality of regions according to the correction data generated by the generation component.

7. The image forming apparatus according to claim 1, wherein
   the forming component includes a developing device configured to adhere a developer adhering to a developing sleeve to a photoreceptor by utilizing a potential difference between the developing sleeve and the photoreceptor, and
   the changing component is configured to change a voltage applied to a charging roller so as to change a potential difference between the developing sleeve and the photoreceptor so that the amount of the developer adhering to the photoreceptor increases.

8. The image forming apparatus according to claim 1, further comprising:
   a first controller configured to control the forming component so as to form a predetermined checking image according to the correction data generated by the generation component being stored in the storage component;
   a receiving component configured to receive an execution instruction by an operator related to a change in the image formation density; and
   a second controller configured to control the changing unit so as to change the image formation density according to an execution instruction being received by the receiving component.

9. The image forming apparatus according to claim 1, further comprising:

a second controller configured to control the changing component so as to change the image formation density according to the correction data generated by the generation component being stored in the storage component without receiving an instruction from an operator.

10. The image forming apparatus according to claim 1, further comprising:
a first controller configured to control the forming component so as to form a predetermined checking image according to the correction data generated by the generation component being stored in the storage component;
a receiving component configured to receive an execution instruction by an operator related to a change in the image formation density; and
a second controller configured to
control the changing component so as to change the image formation density according to the execution instruction being received by the receiving unit if a first mode is set, and
control the changing component so as to change the image formation density according to the correction data generated by the generation component being stored in the storage component without receiving an instruction from an operator if a second mode is set.

11. An image forming method, comprising:
forming an image by a forming component;
generating correction data for correcting density unevenness for each of a plurality of regions divided in a main scanning direction of the image formed by the forming component;
storing the correction data generated;
correcting a density of the image to be formed by the forming component for each of the plurality of regions based on the correction data stored; and
changing an image formation density by the forming component with a uniform amount of change for the plurality of regions after the correction data is generated.

12. The image forming method according to claim 11, further comprising:
updating the correction data so as to reduce densities in other regions of the plurality of regions so as to match a minimum density among densities in the plurality of regions; and
increasing the image formation density so as to compensate for density decrease due to the update of the correction data.

13. The image forming method according to claim 11, further comprising:
executing image formation, which is based on image data representing a test image in which patches of a same density value are placed in each of the plurality of regions, with the correction, and determining a degree of unevenness of a density of each of the patches arranged in each of the plurality of regions based on the image data obtained by reading the test image formed by executing the image formation.

14. The image forming method according to claim 13, further comprising:
determining the degree of unevenness of the density as a difference between a minimum value of respective densities of the patches arranged in each of the plurality of regions in the formed test image and the density of each of the patches.

15. The image forming method according to claim 13, further comprising:
reading an image; and
determining the degree of unevenness of the density of each of the patches arranged in each of the plurality of regions based on image data obtained by reading the test image formed.

16. The image forming method according to claim 11, further comprising:
generating correction data for correcting density unevenness for each of the plurality of regions divided in the main scanning direction of element images respectively formed by a plurality of element image forming components for each of the plurality of element image forming components that form element images of different colors;
storing a plurality of correction data generated, respectively;
correcting a density of each of the element images formed for each of the plurality of regions based on a plurality of correction data stored; and
changing image formation density by the element image forming components with the uniform amount of change for each of the plurality of regions according to the correction data generated.

17. The image forming method according to claim 11, further comprising:
adhering a developer adhering to a developing sleeve to a photoreceptor by utilizing a potential difference between a developing sleeve and the photoreceptor; and
changing a voltage applied to a charging roller so as to change a potential difference between the developing sleeve and the photoreceptor so that the amount of the developer adhering to the photoreceptor increases.

18. The image forming method according to claim 11, further comprising:
forming a predetermined checking image according to the correction data generated and being stored;
receiving an execution instruction by an operator related to a change in the image formation density; and
changing the image formation density according to an execution instruction being received.

19. The image forming method according to claim 11, further comprising:
changing the image formation density according to the correction data generated and being stored without receiving an instruction from an operator.

20. The image forming method according to claim 11, further comprising:
forming a predetermined checking image according to the correction data generated and being stored;
receiving an execution instruction by an operator related to a change in the image formation density;
changing the image formation density according to the execution instruction being received if a first mode is set; and
changing the image formation density according to the correction data generated and being stored without receiving an instruction from an operator if a second mode is set.

* * * * *